JAMES E. ATWOOD, OF TRENTON, NEW JERSEY.

Letters Patent No. 86,801, dated February 9, 1869.

IMPROVED COMPOSITION FOR REFINING AND CARBONIZING IRON.

The Schedule referred to in these Letters Patent and making part of the same

*To whom it may concern:*

Be it known that I, JAMES E. ATWOOD, of Trenton, New Jersey, have invented a new Process of Refining Iron, or converting iron into steel; and I do hereby declare the following to be a full and exact description of the same.

My invention consists in the use of peat and manganese, combined in proper relative proportions, and ground together, as a means for refining iron, and converting iron into steel.

In smelting the crude ore, I prefer to use unslaked lime with the fuel, say about one half as much lime as fuel.

In resmelting and puddling from iron not first treated by my process, I also prefer to use lime as above, the effect of using the lime being to remove the sulphur and slag.

But as an efficient (or further) refining-process, I use, in the crucibles, peat and manganese ground together, in the proportion of about nine pounds of peat, and from one to two pounds of manganese, to a hundred pounds of iron, and I afterward treat the iron by hammering and rolling as usual.

I do not claim the use of lime in smelting iron; nor do I claim the use of peat alone, in the treatment of iron, nor the use of manganese alone; but

I claim, in the carbonization of iron, to refine or convert it into steel, the employment of peat and manganese, substantially as and in the proportions specified.

In testimony whereof, I have signed my name to this specification, in the presence of two subscribing witnesses.

JAMES E. ATWOOD.

Witnesses:
D. C. COLBY,
JNO. D. PATTEN.